United States Patent [19]

Malatesta et al.

[11] Patent Number: 5,442,782

[45] Date of Patent: Aug. 15, 1995

[54] PROVIDING INFORMATION FROM A MULTILINGUAL DATABASE OF LANGUAGE-INDEPENDENT AND LANGUAGE-DEPENDENT ITEMS

[75] Inventors: John A. Malatesta, Alamo; Richard A. Bergquist, Danville, both of Calif.

[73] Assignee: Peoplesoft, Inc., Walnut Creek, Calif.

[21] Appl. No.: 106,500

[22] Filed: Aug. 13, 1993

[51] Int. Cl.$^6$ ............................................. G06F 17/30
[52] U.S. Cl. ............................... 395/600; 364/419.16; 364/974.4; 364/920.4; 364/226.4; 364/283.4; 364/DIG. 1; 364/DIG. 2
[58] Field of Search ................... 395/600; 364/419.01, 364/419.02, 419.12, 419.16

[56] References Cited

U.S. PATENT DOCUMENTS

| | | | |
|---|---|---|---|
| 4,456,969 | 6/1984 | Hevzil et al. | 364/419.12 |
| 4,566,078 | 1/1986 | Crabtree | 364/419.01 |
| 4,595,980 | 6/1986 | Innes | 364/419.02 |
| 4,615,002 | 9/1986 | Innes | 364/419.02 |
| 5,157,606 | 10/1992 | Nagashima | 364/419.02 |
| 5,307,265 | 4/1994 | Winans | 364/419.01 |

OTHER PUBLICATIONS

Cynthia Hartman Kennelly, *Digital Guide to Developing International Software*, Digital Press, (Bedford, Mass., 1991), pp. 179-197, 267-273, 298-303.

Proceedings of the Twenty-First Annual Hawaii International Conference on System Sciences, vol. IV. Applications Track, 5 Jan. 1988, Hahm et al., "POEM—An Office System For International Use", pp. 87-93—especially p. 90.

1990 IEEE International Conference on Systems, Man and Cybernetics Conference Proceedings, 4 Nov. 1990, M. Farid "Software Engineering Globalization and Localization", pp. 491-495.

*Primary Examiner*—Thomas G. Black
*Assistant Examiner*—Paul R. Lintz
*Attorney, Agent, or Firm*—Hecker & Harriman

[57] ABSTRACT

The present invention provides the ability to internationalize a database application by providing a capability to create and maintain related international records. Data items can be stored in a base language with accompanying related copies of the data items represented in multiple languages and/or currencies. Application users can specify a preferred language. When data items are retrieved from a database, and when the user's language preference is not the same as the base language, language-dependent data items are retrieved from the related language records. When a related language record does not exist, or the preferred language is equal to the base language, the data items are retrieved from the base language records. Delete, Insert and Update operations can be performed on base language records, related language records or both.

13 Claims, 14 Drawing Sheets

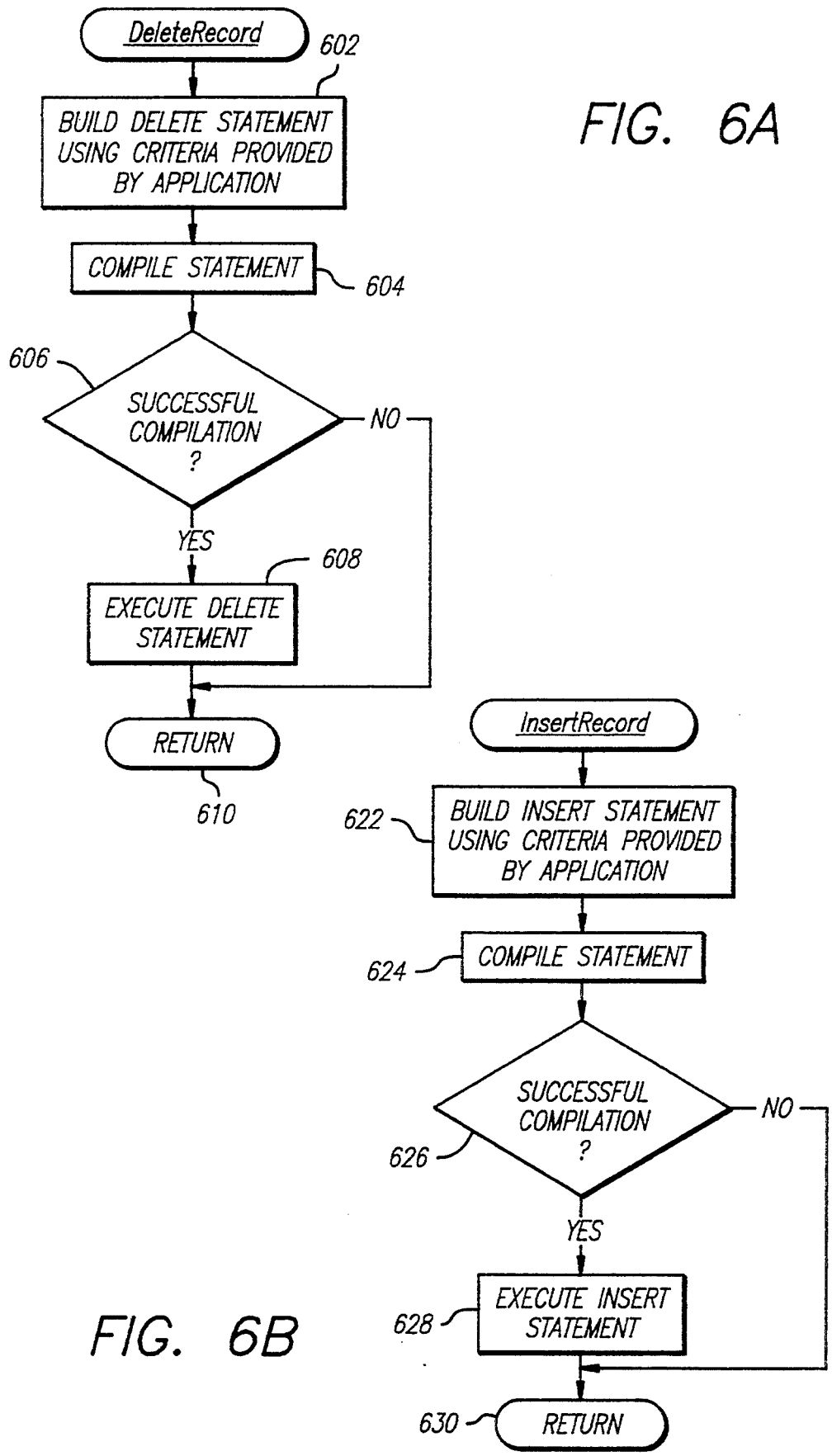

PROVIDING INFORMATION FROM A MULTILINGUAL DATABASE OF LANGUAGE-INDEPENDENT AND LANGUAGE-DEPENDENT ITEMS

BACKGROUND OF THE INVENTION

1. Field of the Invention

This invention relates to the field of multi-language data retrieval and storage.

2. Background Art

Database management systems (DBMS) have been developed to address informational needs by providing tools to define, store and retrieve data. For example, a relational database management system (RDBMS) provides the ability to structure information into relations, or tables, and relating tables using key fields.

The tools provided by a DBMS require considerable expertise to use. For example, to retrieve data from the DBMS, a user must formulate a query using a query language that has its own syntax. Computer software applications can be designed to customize these tools for a particular application (e.g., personnel, accounting, finance, and manufacturing). These applications provide an interface between the application user and the DBMS. They minimize the need to know the intricacies or even the existence of a DBMS.

For example, a clerk in the personnel department of a business may need to retrieve and modify data (e.g., salaries or absences) related to the jobs held by employees of the business. FIG. 1A illustrates the structure of the information to be accessed by the clerk. The clerk may need to change the descriptive title for a particular job. A personnel software application can be designed to facilitate such a change. Panels (i.e., screen displays) can be used to prompt the clerk for the job code, or identifier. Once the user inputs the identifying information, the application can generate a query to retrieve the employee's information from the DBMS, retrieve the information, and display the information in a panel. The clerk can modify the information presented in the panel, and request that the modifications be used to update the employee's information in the DBMS.

The above example illustrates an application that manipulates data that is represented in a single language, English. However, many enterprises are international. Further, the employees at any one site may have different language preferences. Thus, an office in France may employ individuals who speak French, English, or another language. Thus, the information needs of an international business are complicated by the fact that the same information must be provided in different languages to address the language preferences of the individual user. The information must be accessible in multiple languages at any one site.

The jobcode tables in FIG. 1B illustrate a method of storing international information in a prior art database application. Two separate SQL tables are created for each of the languages in which the information is represented. Thus, the original job code table in FIG. 1A becomes two tables that are each stored in their respective databases in FIG. 1B. Database 120 contains a version of the database (including the job code table) with the data represented in English. Database 130 contains a version of database (including the job code table) with the data represented in French. As can be seen from FIG. 1A, the numeric job code field 104 is a numeric field and has the same value in the English and French languages. This method, therefore, results in an unnecessary duplication of information. Further, if all of the users at a database site do not use the same base language, both versions of the database must be stored and maintained to accommodate all users.

Therefore, it is desirable to provide an ability to store and retrieve the same information in a preferred language without unnecessary duplication, and to provide the information based on the language preference of a user. Further, it is desirable to provide an ability to maintain all multilingual version of the information.

SUMMARY OF THE INVENTION

The present invention provides the ability to internationalize a database application by providing a capability to create and maintain related international records. Data items can be stored in a base language with accompanying related copies of the data items represented in multiple languages. A data item can be translated into multiple languages by accessing the data item's multilingual copies.

Application users can specify a preferred language. When data items are retrieved from a datbase, and when the user's language preference is not the same as the base language, language-dependent data items are retrieved from the related language records. When a related language record does not exist, or the preferred language is equal to the base language, the data items are retrieved from the base language records. Delete, Insert and Update operations can be performed on base language records, related language records or both.

BRIEF DESCRIPTION OF THE DRAWINGS

FIG. 6A provides a process flow for DeleteRecord.

FIG. 6B illustrate a process flow for InsertRecord.

DETAILED DESCRIPTION OF THE INVENTION

A method and apparatus for multi-language data retrieval and storage is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

DATABASE OVERVIEW

Figure 1A:
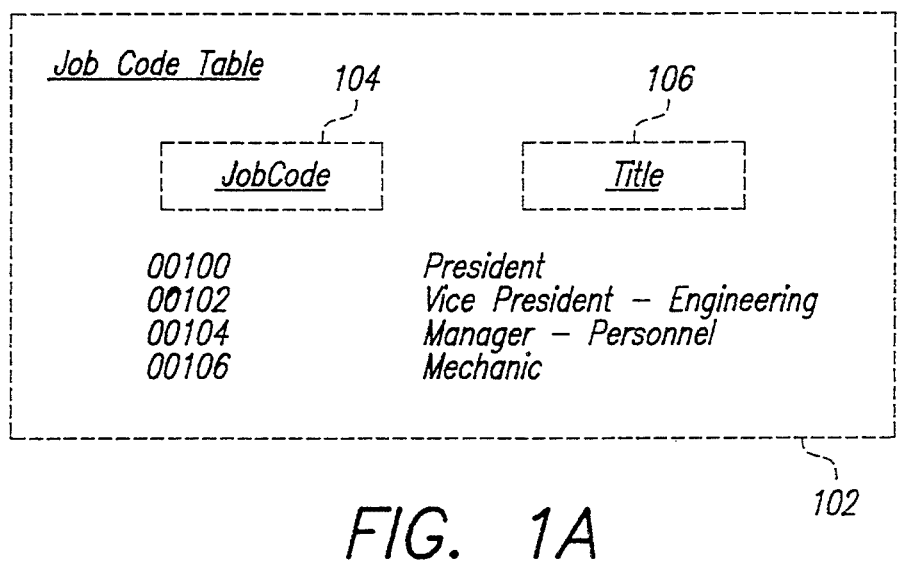
FIG. 1A illustrates a job code table.
Figure 1B:
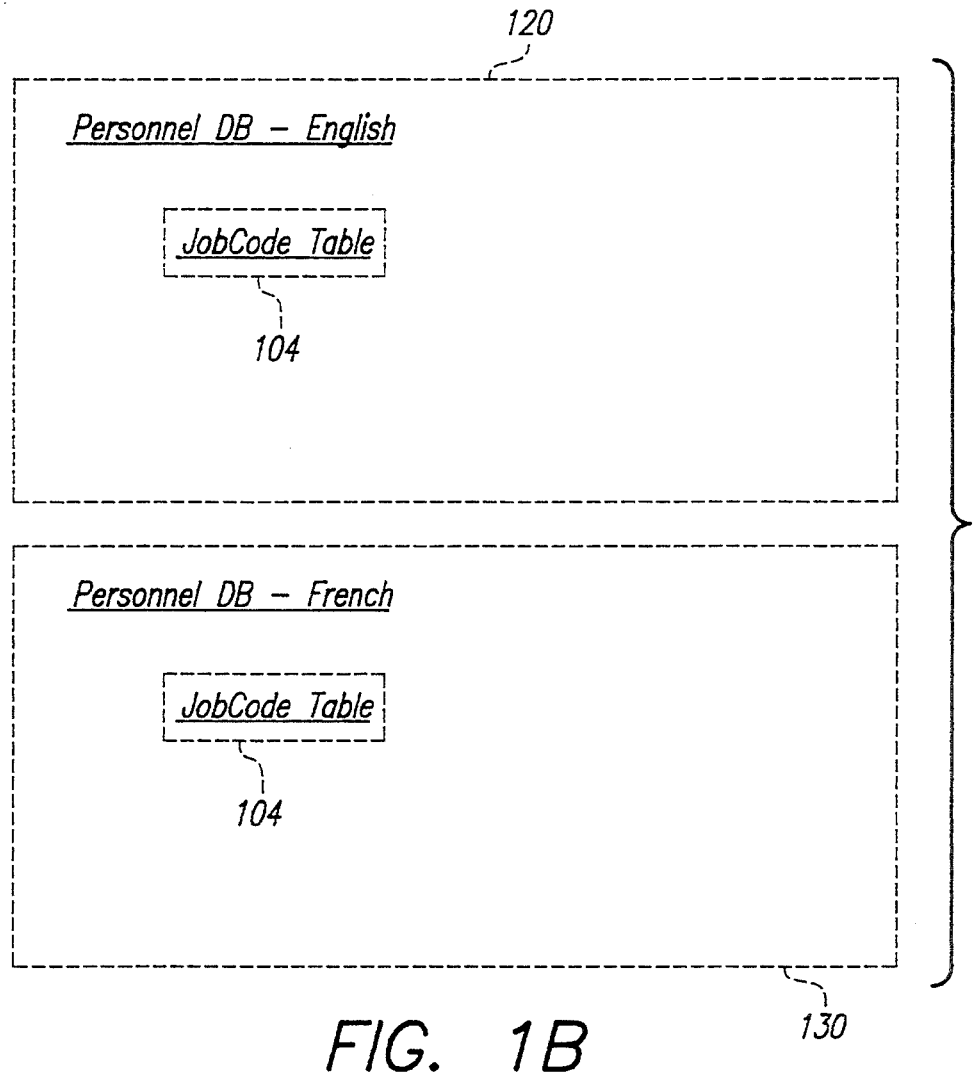
FIG. 1B illustrates a prior art version of an internationalized database application.
Figure 2:
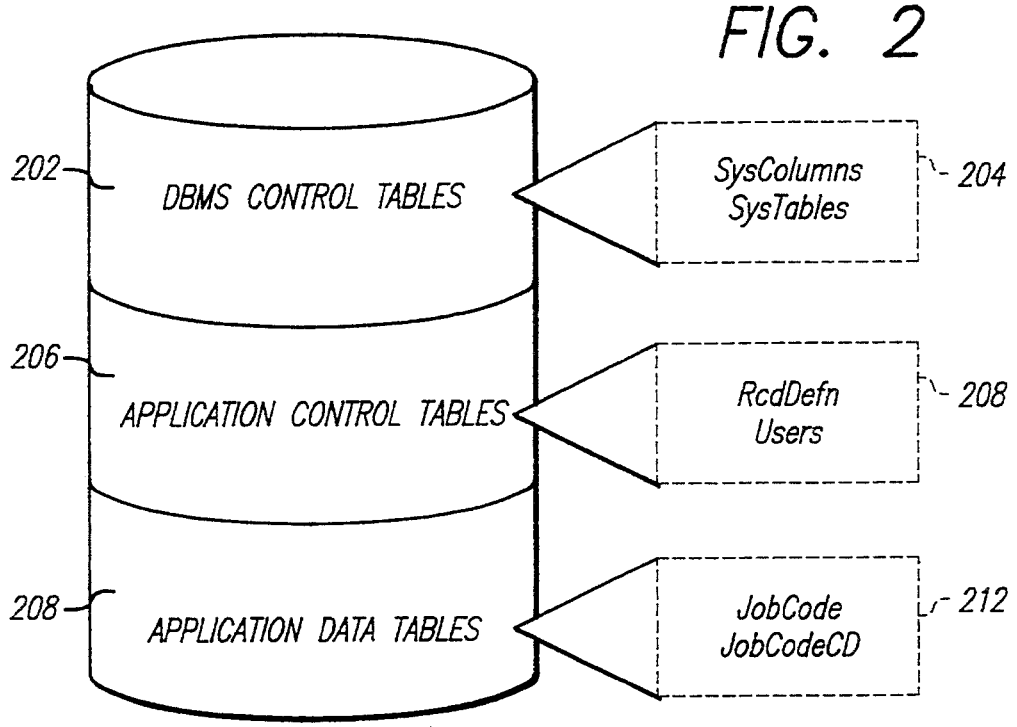
FIG. 2 provides a diagram of control and data tables.

A DBMS and the applications that use the DBMS store at least two types of information. The first type is the actual data for which the DBMS and application are designed to store and retrieve such as employee, finance, accounting, and manufacturing data. The second type is the control information. For example an DBMS uses its own resources to store and retrieve information about the structure of the actual data. FIG. 2 provides an overview of these two types of data using relations such as are used in an RDBMS. DBMS Control Tables may include a control table that identifies all of the tables that have been created along with the number of fields in each table. A second DBMS Control Table may contain information about each field contained in each table.

The application control tables can supplement the DBMS Control Tables by providing additional information to support features provided by the application environment and not by the DBMS. An example of such a feature is the multi-lingual capability of the present invention.

Application data tables contain the data of the enterprise used to satisfy the informational needs of the enterprise. For example an enterprise may wish to retain information about the jobs that are needed to conduct the business of the enterprise. The application data tables 212 in FIG. 2 can be used to retain a list of the jobs and a description for each job.

LANGUAGE PREFERENCES

One example of the type of data that is stored in the application control tables of FIG. 2 are the base and preferred language designations. The present invention uses base language and preferred language designations to identify the language in which information should be accessible. The base language is defined as a site default. For example, an application accesed by users whose native language is primarily German would identify German as the base language. However, each user may override the base language by defining a preferred language. Thus, a user using an application with a base language of German can access the English version of the information by identifying English as the user's language preference.

LANGUAGE RECORDS

Figure 3:
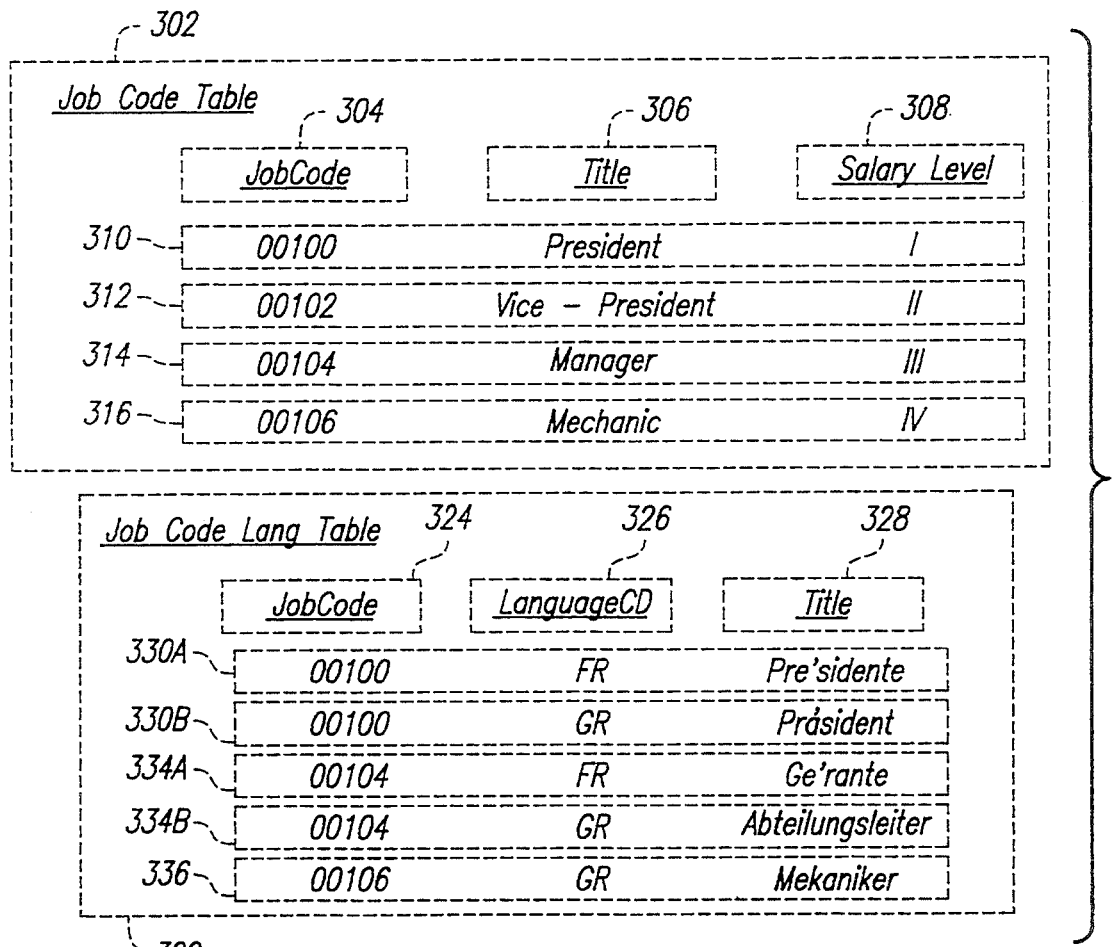
FIG. 3 illustrates a base language record and related language record in an RDBMS.

The present invention provides the ability to maintain multilingual information in the same database by defining a base language record and related language records. FIG. 3 illustrates a base language record and a related language record in an RDBMS.

Base Language Record

FIG. 3 assumes that the base language is English. The base language record 302 illustrates the job code table previously exemplified. JobCode field 304 is a key for the table, and uniquely identifies an entry in the table. Title field 306 is a descriptive field that is conducive to the related record capabilities of the present invention because its contents will vary based on the language used. While Title field 306 may be of type character, it should be noted that any such data item can be of any type that might vary in an international application. For the sake of another example, the present invention can be used to provide multiple currencies.

In the preferred embodiment, the values of the data items represented in the base language are stored in the base language record. Thus, any database request in the base language will be accomplished by accessing the base language records only. Because the base language is usually the preferred language of the majority of the users, data access is optimized.

Related Language Record

As previously indicated, a base language record contains data items in the base language. A related language record contains data items in a language other than the base language. When a user prefers a language other than the base language, a related language record is accessed to obtain the data items that are language-dependent.

Related language record 322 in FIG. 3 illustrates a related language record for base language record 302. Like jobcode field 304, jobcode field 324 contains a code that identifies a job. However, jobcode field 324 does not uniquely define an entry in jobcode related language table 322. The unique key into related language record 322 is a combination of jobcode field 324 and LanguageCd field 326. LanguageCd field 326 identifies the language in which the data items in the record are represented. Thus, a combination of jobcode field 324 and languageCD field 326 uniquely identify an entry in table 322.

In addition to the keys used to identify a record, a related language record contains only those data items whose values are represented differently in different languages. For example, title field 306 is represented by title field 328. However, salary level field 308, a language-independent field, is not included in related language table 322.

Using a jobcode value, a record can be accessed from base language table 302. Further, using the same jobcode value and a language code, a record can be accessed from related language table 322. Data items that are represented in the same manner regardless of the language used, are accessed from the base language record. However, when a user's preferred language is different than the base language, values for language-dependent fields are accessed from an existing related language record.

There is no requirement that a related language record exist. For example, record 312 in table 302 does not have a related language record in related language table 322. Further, there is no requirement that a related language table exist. When a related language record or related language table does not exist, the present invention uses the data values in the base language record.

Explicit Record Linkage

Some ability to establish a linkage betwee base language and related language records to provide the ability to access (i.e., read or write access) language-independent and language-dependent data items. The present invention provides the ability to read data items in multiple languages, and to update the muliple language data. Various methods can be used to establish a linkage.

For example, particular naming conventions can be employed to identify the tables that contain the base language and related language records such as JobCode and JobCodeCd. The naming convention requires that the naming convention be predetermined thereby sacrificing flexibility.

In the preferred embodiment of the present invention, an express linkage is established between a base language record with a related language record. An interactive facility (i.e., editor) provides an ability to create or modify the definition or structure of data, and identify a related language record. To illustrate using the tables 302 and 322 in FIG. 3, the editor can be used to identify table 322 as containing related language records for table 302.

The linkage can be stored in application control tables 206 of FIG. 2. When a job code data access is initiated and the language being used is not the same as the base language, the linkage information in application control tables 206 can be used to identify the location of the job code related language records. The base language record is used as the repository of the language-independent data items can be accessed from.

If a language other than the base language is being used, data items that depend on the language being used must be handled differently than the language-independent data. Thus, it is necessary to be able to identify both a data item's language dependencies. Various techniques can be used to identify language dependencies. For example, when a table is defined, an additional field attribute can be used as a flag to indicate whether or not the field value is dependent on language. It can be seen that this, or any other technique, can be used without departing from the scope of the present invention.

In the preferred embodiment, the data items that are language-dependent can be identified using identical field names in the related language and base language table definitions. For example, referring to FIG. 3, title field 306 as the same field name as title field 328. Therefore, it can be seen that a title field value is language-dependent and can vary with the choice of languages.

Because a base language record contains the language-dependent data values in the base lanaguage only, the repository of language-dependent data items depends on the existence of a related language record. If a related language record does not exist, the base language record contains the language-dependent data items. In this case, like the language-independent data, the language-dependent data items are represented in the base language. If a related language record exists for the preferred language, the related language record is accessed for the language-dependent data.

RECORD ACCESS MANAGER

Customized database applications usually provide the ability to read and modify (i.e., insert, delete, and update) information in an application database. Referring to FIG. 3, when an insert operation is performed on a job title, it is possible that two inserts must be done. That is, when the preferred language is not the base language, a base language record and a related language record must be created. Similarly, a delete, update, or read can involve both a base language and related language record.

Figure 4:
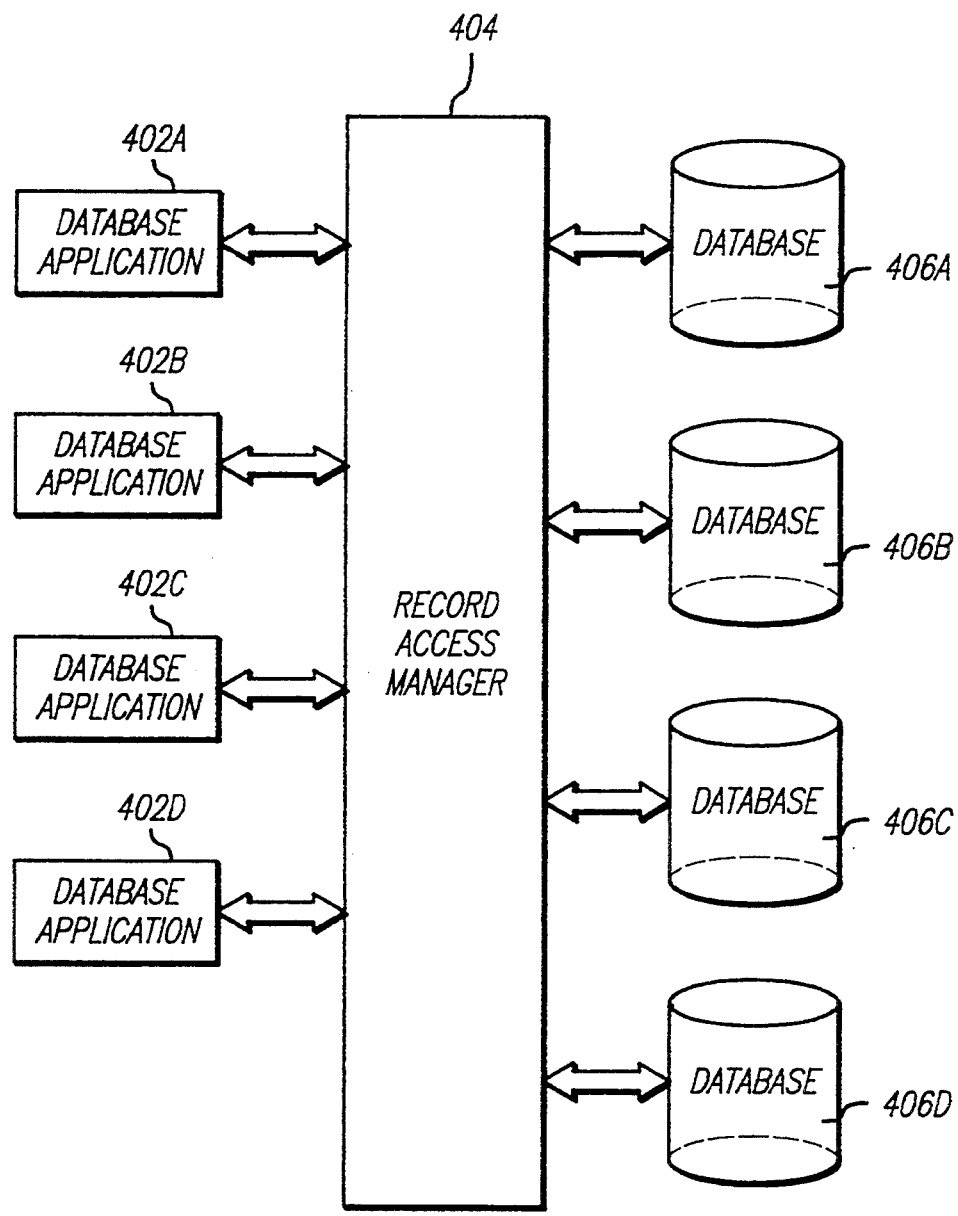
FIG. 4 illustrates a block diagram of a database access facility.

Thus, a database accessing capability can be used to manage access to both base language records and related language records. FIG. 4 illustrates a block diagram of a database access facility to access both types of records. Database applications 402A–402B are computer software applications and can generate database access requests.

Because many applications such as applications 402A–402B generate database requests to databases 406A–406C, record access manager 404 can be designed to handle all of these database requests thereby localizing this functionality. However, it can be seen that the functionality provided by record access manager 404 can be integrated into each of database applications 402A–402D without departing from the scope of the present invention.

Localizing database access functionality in record access manager 404 provides the further advantage of minimizing any modifications to database applications 402A–402D to use the features of the present invention. For example, applications 402A–402D can generate a database request for the jobcode data provided in FIG. 3. Record Access Manager 404 can determine the need to access a related language record, and return the requested items using the base, language record, and where appropriate, the related language record.

Figure 5A:
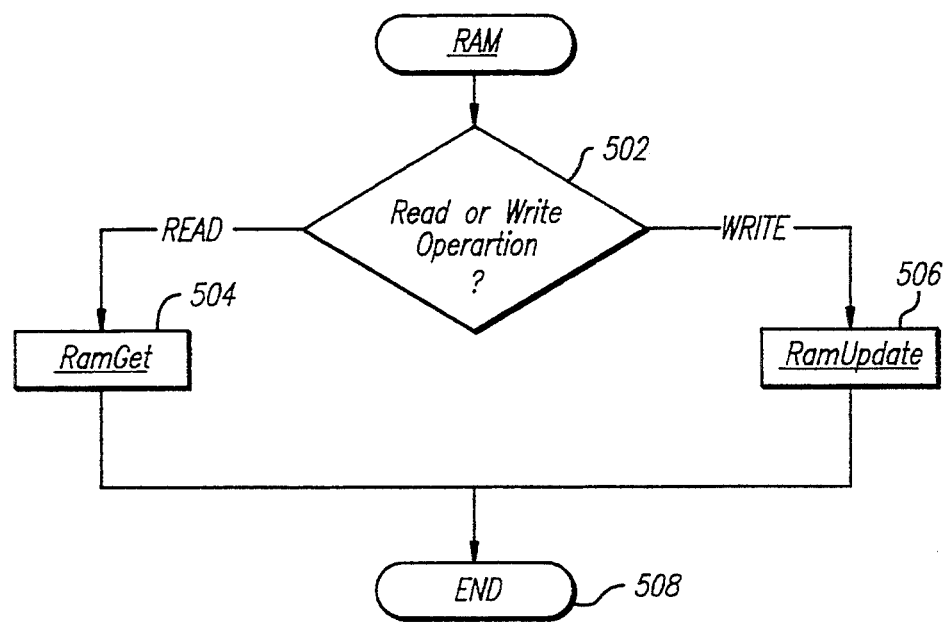
FIG. 5A illustrates a process flow for record access manager (RAM).

Record access manager 406 provides select (i.e., select a record or records), update, insert and delete capabilities. FIG. 5A illustrates a process flow for record access manager (RAM). At decision block 502 (i.e., "read or write operation?"), if the operation to be performed is a read operation processing continues at processing block 504 to get one or more records. If, at decision block 502, the operation is a write (i.e., update, insert, or delete) processing continues at 506 to perform the update.

Two different types of reads are provided by the present invention. One read is performed using two selects that are unioned together. The first half of the unioned select statement selects a record or records from the base language record. The second half selects a record or records from the related language record. The union of the two selects results in the retrieval of language-independent fields from the base language record, and the language-dependent fields from the related language record. The following statement provides and example of this selection using the jobcode tables in FIG. 3:

Select A.jobcode, D.title
from jobcode_tbl A, jobcode_lang_tbl D
where    D.jobcode=A.jobcode    and    D.languageCD="FR"
Union
Select jobcode, title
from jobcode_language_tbl A
where not exists (select 'X' from jobcode_lang_tbl D
where    D.jobcode=A.jobcode    and    D.languageCD="FR")

This example results in a union of the jobcode base language and related records by pairing the jobcode field values in both tables. This example assumes that the preferred language is French, and only those related language record entries represented in French (i.e., languageCd="FR") will be included in the union. The first select selects the jobcode from the base language record, and the description from the related language record for French related language records. The second select selects the jobcode and description from the base language record where a related language record does not exist for the preferred language (i.e., French).

A union operation is limited to situations where the number of rows and columns are identical between the select statements. Another selection technique can be used when a union cannot be used. This second technique performs a select on the base language record and a select on the related language record. Records are then fetched from the outcome of these selects. The following statement provides and example of the selects using the jobcode tables in FIG. 3:

Select jobcode, title, salaryLevel
from jobcode_tbl where jobcode='00100'
Select jobcode, languageCD, title
from jobcode_language_tbl
where jobcode='00100' and D.languageCD="FR")
order by jobcode, languageCD, title Two separate results tables are created from the selects. The first table contains one or more records from the base language record jobcode_tbl. Another table contains one or more records from jobcode_language_tbl. Records can be fetched from these tables.

RAM Get

Figure 5B:
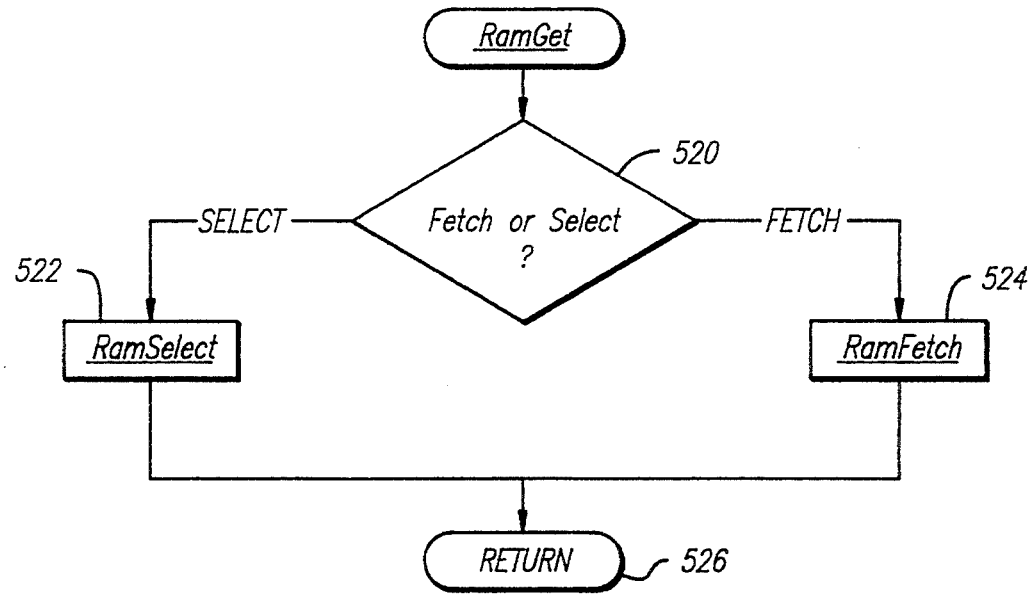
FIG. 5B illustrates an overview of the process flow for the read operations.

FIG. 5B illustrates an overview of the process flow for the read operations. At decision block 520 (i.e., "fetch or select?"), if the read operation is a select, processing continues at block 522 to invoke RamSelect. If, at decision block 520, the operation is a fetch operation, processing continues at block 524 to invoke Ram-Fetch. In both cases processing returns at block 526.

RAMSelect

Figure 8:
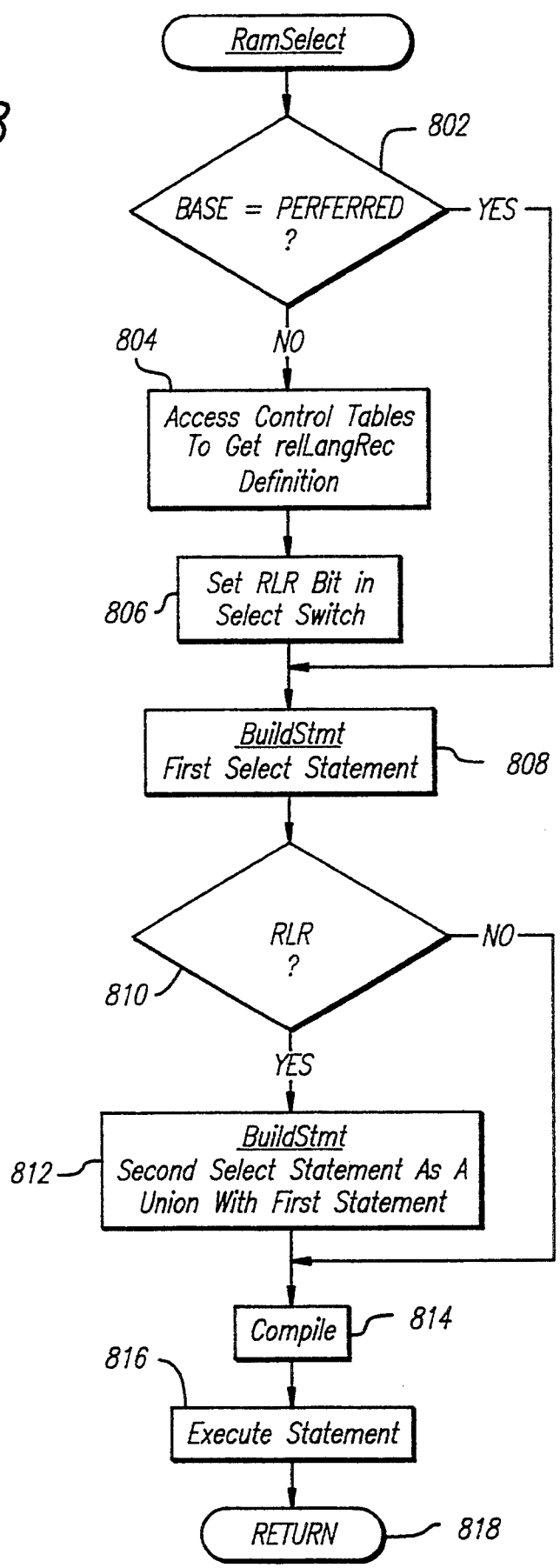
FIG. 8 provides a process flow for RamSelect.

A record selection process flow is provided in FIG. 8. At decision block 802 (i.e., "base=preferred?"), if the base language is equal to the operator's language preference, processing continues at processing block 808. If, at decision block 802, the operator's language preference is not equal to the base language, processing continues at processing block 804 to access control tables to get related language record definition for the related language records associated with the base language records. At processing block 806, an "rlr" bit is set in a select switch to indicate that related language records exist for the base language records. Processing continues at block 808.

At processing block 808, BuildStmt is invoked to build the first portion of the unioned select statements. At decision block 810 (i.e., "rlr?"), if rlr is true, processing continues at processing block 812 to build the second half of the unioned select statements, and processing continues at block 814. If, at decision block 810, rlr is false, processing continues at block 814. The select statement is compiled and executed at block 814 and 816, respectively. Processing returns at block 818.

BuildStmt builds a select statement according to the criteria provided by an application. As illustrated in the examples of select statements, a select statement typically contains "select", "from", "where", and "order by" phrases. The "select" phrase identifies the fields to be selected (e.g., jobcode, title, salaryLevel). The "from" phrase defines the tables from which the fields are to be selected (e.g., from jobcode_tbl). The "where" phrase identifies the criteria for selection (e.g., where jobcode='00100'). The "order by" phrase defines the sort seequence for the selected records (e.g., order by jobcode).

Figure 9:
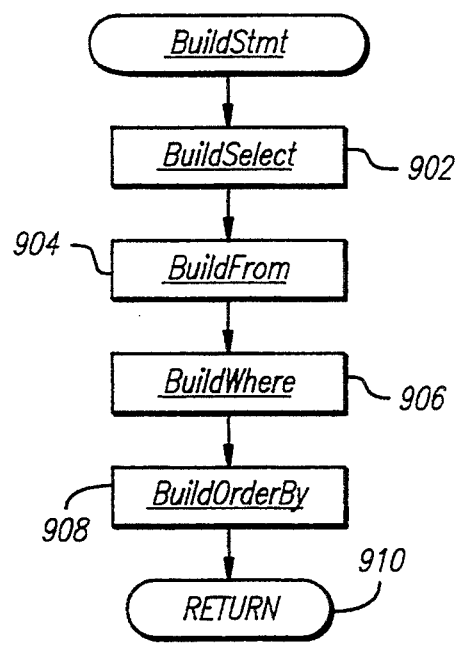
FIG. 9 illustrates a process flow for BuildStmt.

FIG. 9 illustrates a process flow for BuildStmt. At processing block 902, BuildSelect is invoked. At processing block 904 BuildFrom is invoked. At processing block 906, BuildWhere is invoked. BuildOrderBy is invoked at processing block 908. Processing returns at block 910.

Figure 10:
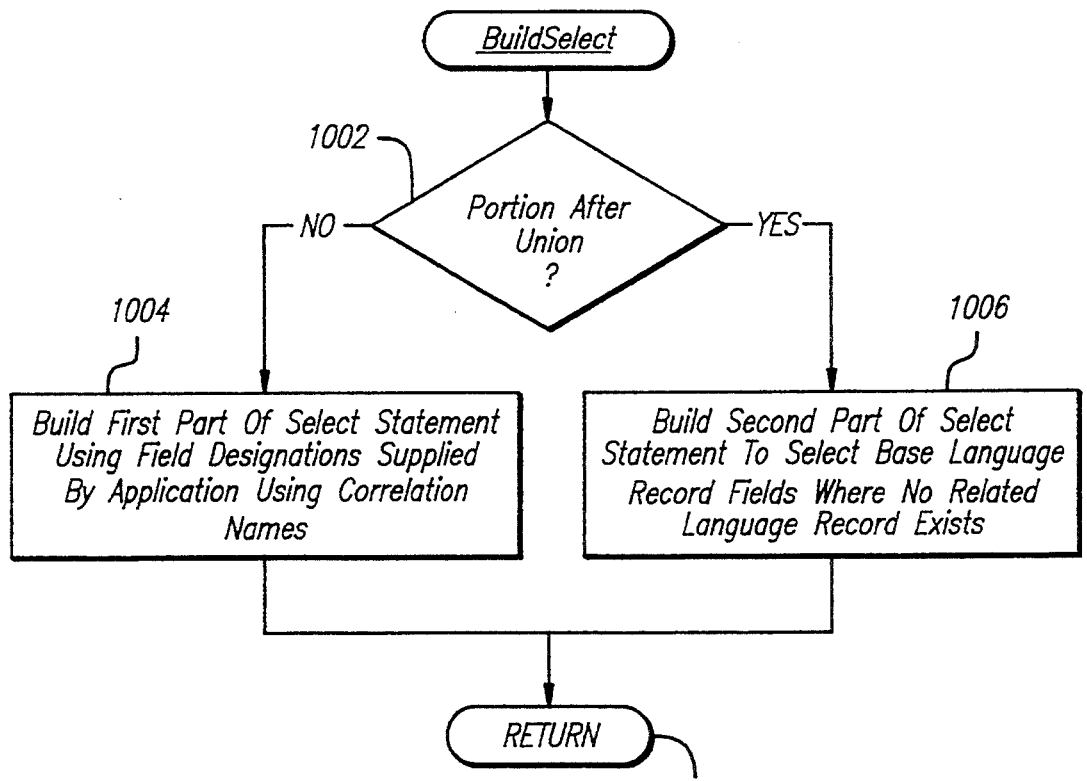
FIG. 10 illustrates a process flow for BuildSelect.

FIG. 10 illustrates a process flow for BuildSelect. At decision block 1002 (i.e., "portion after union?"), if BuildSelect is called to generate the "select" phrase for the first half of the unioned select statement, processing continues at block 1004. At processing block 1004, the first half of the select statement is generated by initializing the phrase to "select", identifying fields to be selected and including them in the "select" phrase. Processing returns at block 1008. If, at decision block 1002, the second half of the union is to be generated, processing continues at processing block 1006. At processing block 1006, the second half of the select statement is generated by including the phrase to "union select" in the existing select phrase and identifying the fields that should be selected from the base language record when a related language record does not exist in the preferred language. Processing returns at block 1008.

Figure 11:
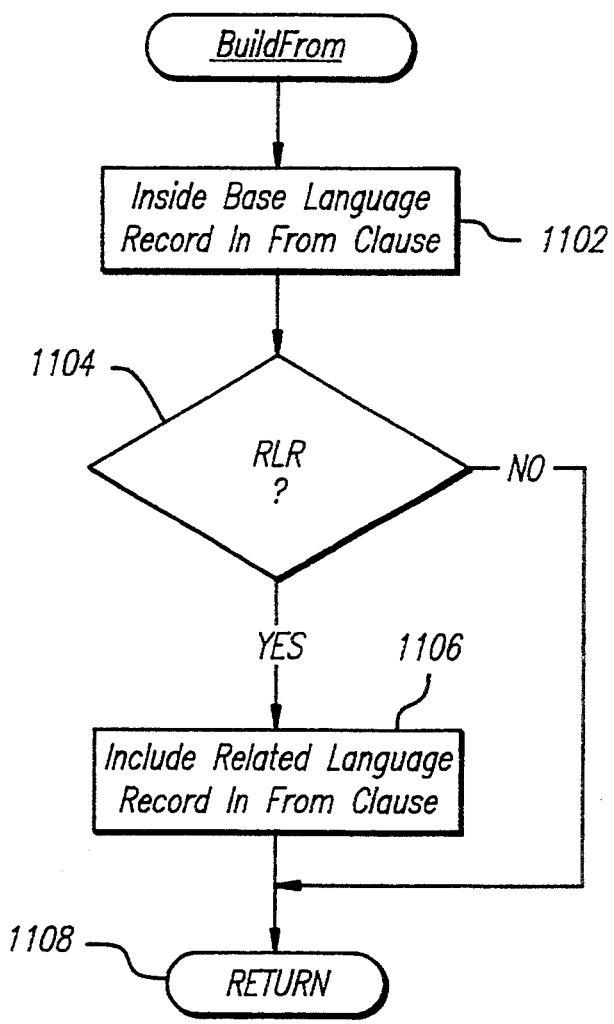
FIG. 11 provides a process flow for BuildFrom.

FIG. 11 provides a process flow for BuildFrom. At processing block 1102, the base language record name is include in the "from" clause. At decision block 1104 (i.e., rlr?"), if related language records exist for the base language records, processing continues at block 1106 to include the relate language record name in the "from" clause. Processing returns at block 1108. If, at decision block 1104, related language records do not exist, process returns at block 1108.

Figure 12:
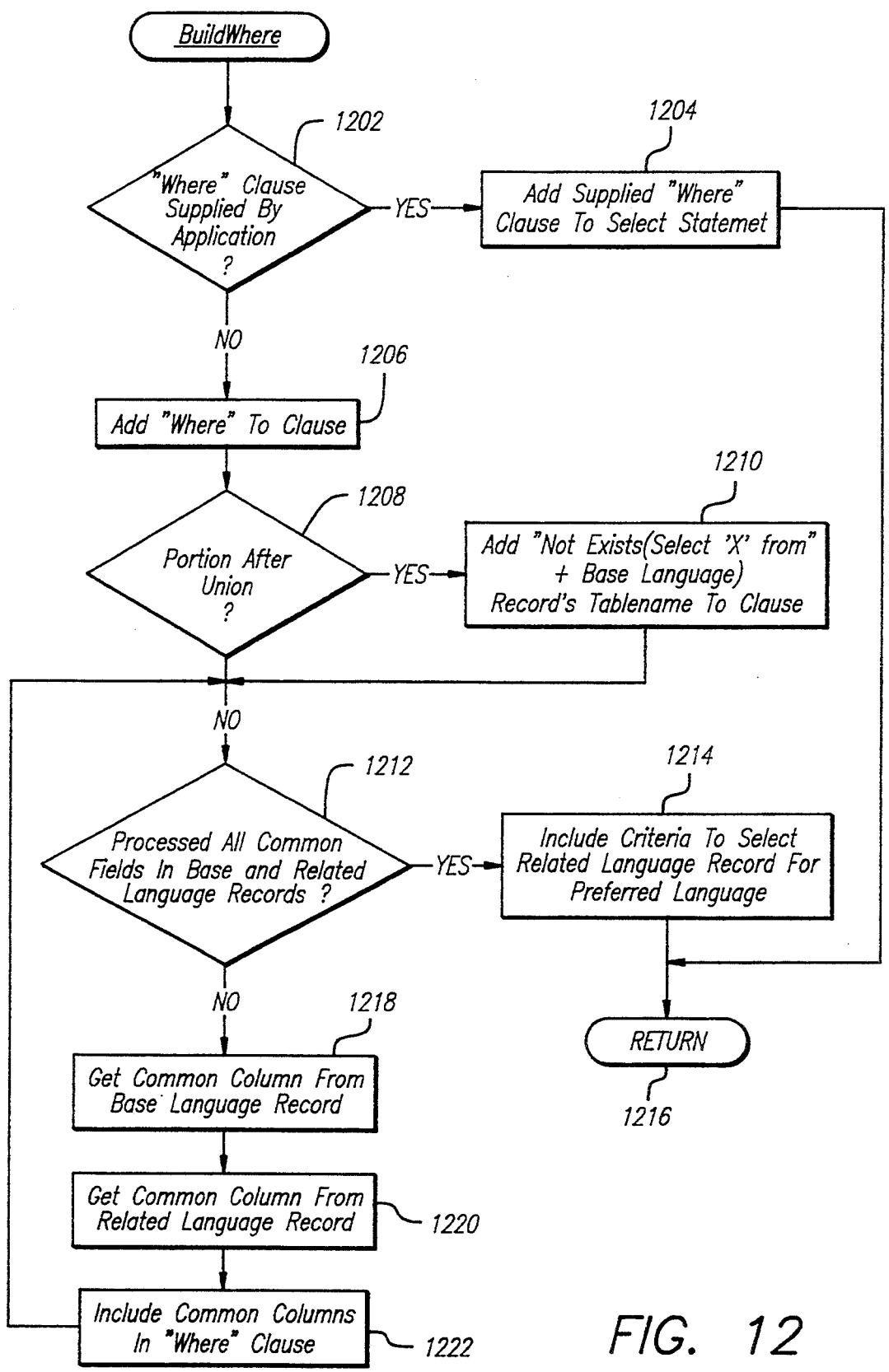
FIG. 12 illustrates a process flow for BuildWhere.

FIG. 12 illustrates a process flow for BuildWhere. At decision block 1202 (i.e., "where clause supplied by application?"), if the "where" phrase is supplied by the application, processing continues at block 1204 to include the supplied "where" phrase in the select statement, and processing returns at block 1214. If the "where" clause is not supplied, processing continues at processing block 1206.

At processing block 1206, the character "where" are added to the select statement. At decision block 1208 (i.e., "portion after union?"), if the second half of the unioned select statement is currently being processing, the phrase "not exists (select 'X' from" and the base language record's name is added to the "where" clause. Processing continues at decision block 1212. If, at decision block 1208, the first half of the select statement is being processing, processing continues at decision block 1212.

At decision block 1212 (i.e., "processed all common fields in base and related language records?"), if all of the fields have been examined, processing continues at block 1214 to include criteria for selecting related language records in the preferred language, and processing returns at block 1216. If, at decision block 1212, all fields have not been examined, processing continues at block 1218.

In an DBMS, some method is used to relate data. For example, in an RDBMS, two tables can be joined using common fields. That is, fields that have values that can be tested against one another in some manner to determine that the information in a record in one table can be joined with records in another table. For example, referring to FIG. 3, records in jobcode_tbl can be joined on the jobcode common field. At processing block 1218, a common column is retrieved for the base language records. At processing block 1220, the common column is retrieved for the related language record. At processing block 1222, the common column names are included in the where clause separated by a test operator (e.g., jobcode_tbl.jobcode=jobcode_lang_tbl.jobcode). Processing continues at decision block 1212 to process remaining common columns.

Figure 13:
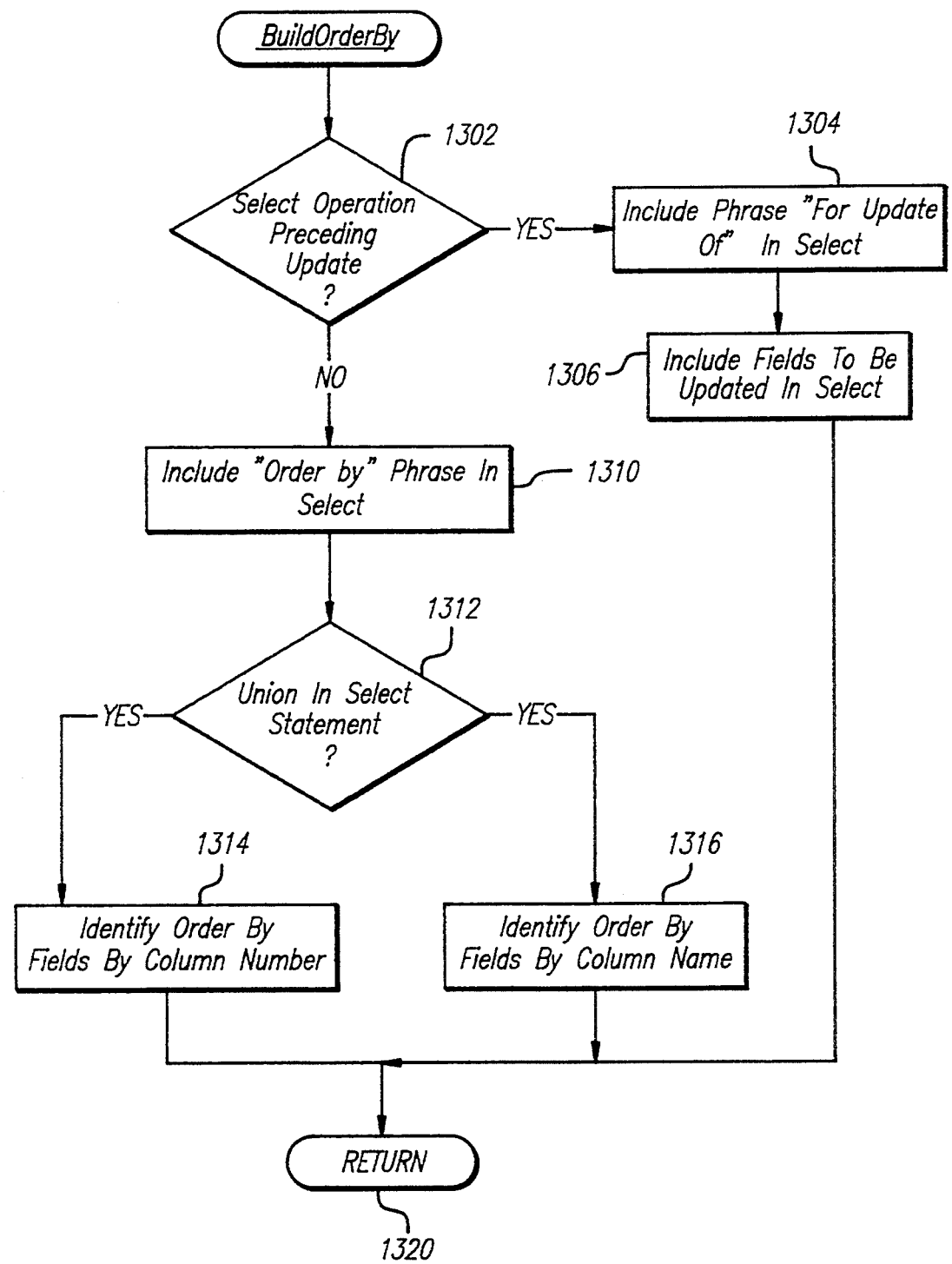
FIG. 13 provides a process flow for BuildOrderBy.

FIG. 13 provides a process flow for BuildOrderBy. At decision block 1302 (i.e., "select operation preceding update?"), if the select operation precedes an update operation, the phrase "for update of" in statement at block 1304. At processing block 1306, fields to be updated are added to the statement, and processing returns at block 1320. If, at decision block 1302, the select operation does not precede an update, processing continues at decision block 1308. At processing block 1310, "order by" phrase is added to the statement. At decision block 1312 (i.e., "union in select statement?"), if the statement contains a union, processing continues at block 1314 to identify "order by" fields by column number. If, at decision block 1312, if the statement does not contain a union, fields are identified by their name in block 1316. In both cases, processing returns at block 1320.

RAMFetch

As previously indicated, the record selection capabilities of the present invention provide the ability to select records from the base language record in a select statement that is independent of the select statement used to select related language records. Such a capability can be used, for example, when a union select cannot be performed. In the case where separate statements are performed, RAMFetch can be used to fetch records from the results of the separate selects.

Figure 14:
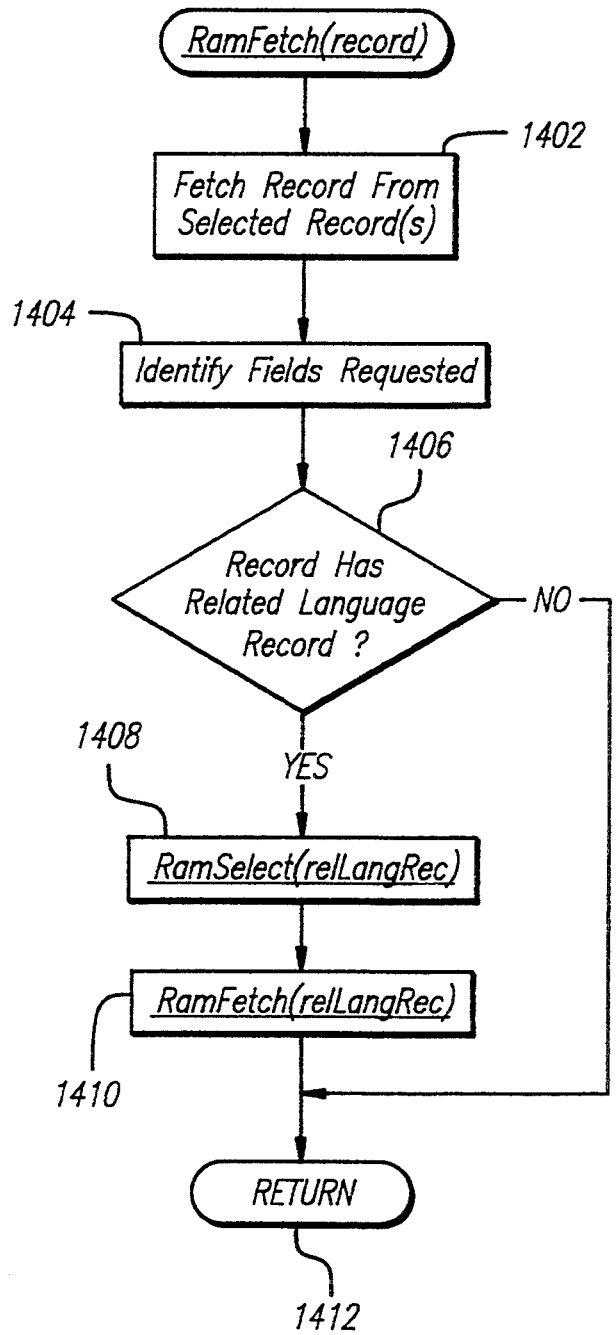
FIG. 14 illustrates a process flow for RAMFetch.

FIG. 14 illustrates a process flow for RAMFetch. At processing block 1402 records are fetched from the selected record(s). The record fields are identified at processing block 1404. At decision block 1406 (i.e., "record has related language record?"), if the record does not have a related language record, processing returns at block 1412. If, at decision block 1406, the record has a related language record, processing continues at processing block 1408 to invoke RamSelect to select related language records. Processing continues at 1410 to invoke RamFetch to fetch related records from the selected related language records. Processing returns at block 1412.

RAM Update

Figure 5C:
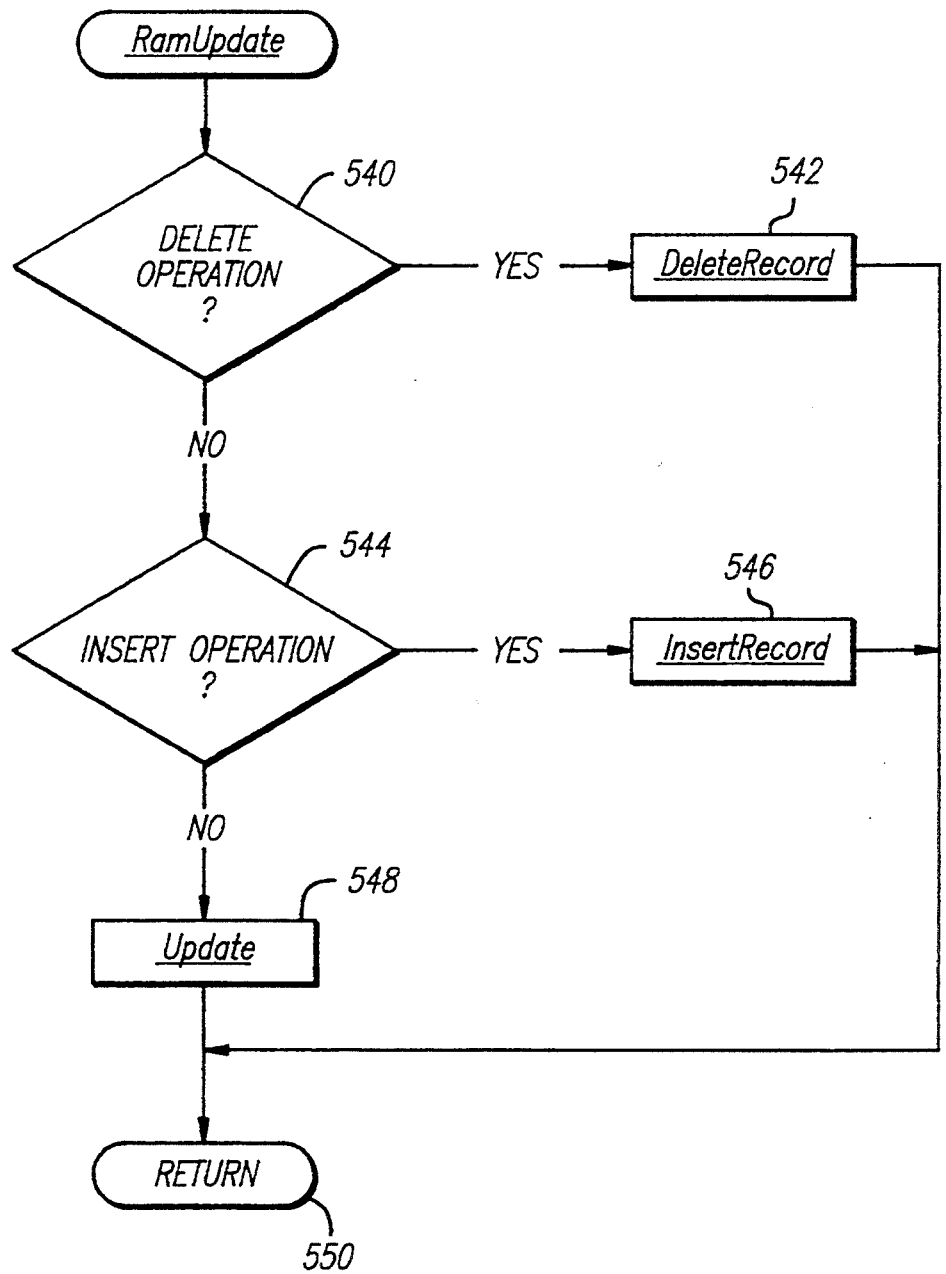
FIG. 5C provides an overview of a process flow of RamUpdate

In addition to the read operations, RAM provides write operations to update data items in a database. Referring to FIG. 5A, if at decision block 502 (i.e., "read or write operation?"), a write operation results in the invocation of RamUpdate at block 506. FIG. 5C provides an overview of a process flow of RamUpdate. At decision block 540 (i.e., "delete operation?"), if a delete operation is detected, processing continues at processing block 542 to invoke DeleteRecord. Processing returns at block 550.

If, at decision block 540, a delete operation is not detected, processing continues at decision block 544. At decision block 544 (i.e., "insert operation?"), if an insert operation is detected, processing continues at processing block 546 to invoke InsertRecord. Processing returns at block 550. If, at decision block 544, an insert operation is not detected, processing continues at block 548 to invoke Update. Processing returns at block 550.

Record Deletion and Insertion

FIGS. 6A-6B illustrate :process flows for DeleteRecord and InsertRecord. The logic of both are similar, and are discussed together. At processing blocks 602 and 622, the delete or insert (respectively) statement is built. At processing blocks 604 and 624, the statement is compiled. If at decision blocks 606 or 626 (i.e., "successful compilation?"), if the compile was unsuccessful, processing returns at block 610 or 630, respectively. If the compilation was successful, the statement is executed at processing blocks 608 and 628 and, processing returns at block 610 or 630, respectively.

Record Update

Figure 7A:
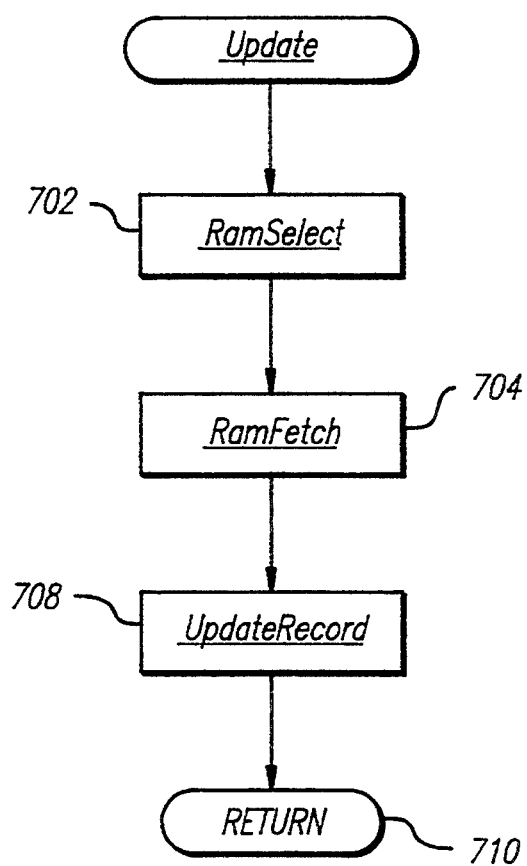
FIG. 7A provides a process flow for Update.

FIG. 7A provides a process flow for Update. At processing 702, RamSelect is invoked to select one or more records to be updated. At processing block 704, RamFetch is called to fetch the record(s) for update. At processing block 708, UpdateRecord is invoked to perform the update(s). Processing returns at block 710.

Figure 7B:
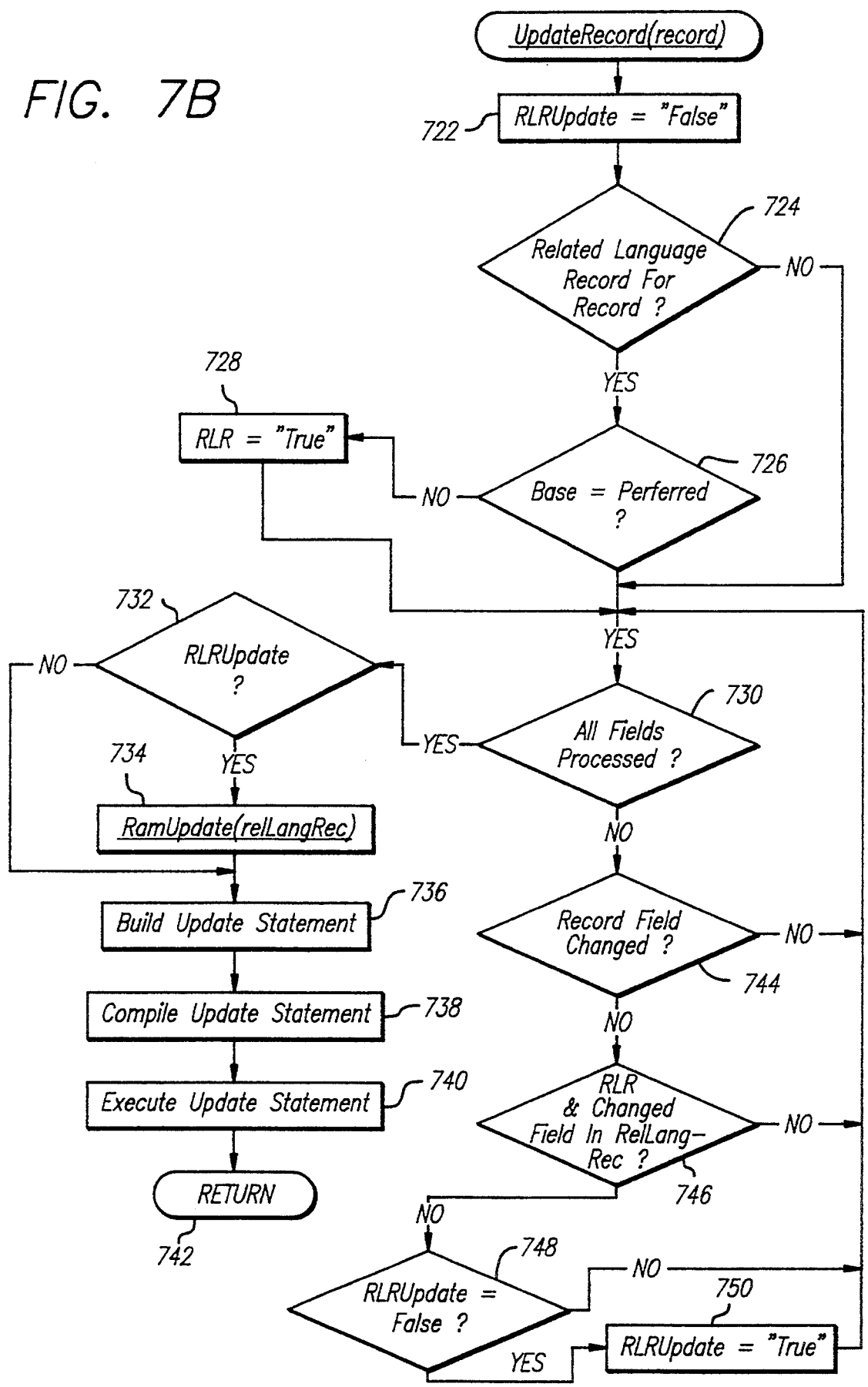
FIG. 7B illustrates a process flow for UpdateRecord.

FIG. 7B illustrates a process flow for UpdateRecord. At processing block 722, RLRUpdate flag is set to false. At decision block 724 (i.e., "related language record for record?"), if there is no related language record for the base language record, processing continues at decision block 730. If there is a related language record for the base language record, processing continues at decision block 726. If at decision block 726 (i.e., "base=preferred?"), if the base language is the same as the operator's language preference, processing continues at decision block 730. If, at decision block 726, the operator's language preference is not the same as the base language, RLR flag is set to true, and processing continues at decision block 730.

At decision block 730 (i.e., "all fields processed?"), if all of the record fields have not been processed, processing continues at decision block 744. If at decision block 744 (i.e., "record field changed?"), if an examination of the current field does not detect a change to the current field, processing continues at decision block 730 to process any remaining fields. If a change is detected at decision block 744, processing continues at decision block 746.

At decision block 746 (i.e., "RLR & changed field in relLangRec?"), if RLR is false and/or the changed field does not exist in the related language record, processing continues at decision block 730 to process any remaining fields. If RLR is true and the changed field does exist in the related language record, processing continues at decision block 748. At decision block 748 (i.e., "RLRUpdate=False?"), if RLRUpdate is true, processing continues at decision block 730 to process any remaining fields. If RLRUpdate is false, RLRUpdate is set to true, and processing continues at decision block 730 to process any remaining fields.

If, at decision block 730 (i.e., "all fields processed?"), all of the fields have been processed, processing continues at decision block 732. At decision block 732 (i.e., "RLRUpdate?"), if RLRUpdate is true, processing continues at block 734 to invoke RamUpdate to process the updates to the related language record, and processing continues at processing block 736. If RLRUpdate is false at decision block 732, processing continues at processing block 736.

At processing block 732, the update statement is formulated. At processing block 738, the update statement is compiled. The update is executed at processing block 740. Processing returns at block 742.

Thus, a method and apparatus for multi-language data retrieval and storage has been provided.

We claim:

1. A method of providing multilingual versions of data items in a computer database system comprising the steps of:

identifying a base language in which language-independent data items and language-dependent data items can be represented in said computer system;

identifying a preferred language in which said language-dependent data items and said language-independent data items can be represented;

storing a base language version of said language-dependent data items and language-independent data items in a base language record;

creating a related language version of said language-dependent data items when a preferred language version of said language-dependent data items is created;

accessing in said base language record said language-independent data items;

accessing in said base language record said language-dependent and said language-independent data items when said base language is the same as said preferred language;

accessing in said base language record said language-dependent data when said related language version does not exist for said preferred language; and accessing in said related language record said language-dependent data items when said related language version does exist in said preferred language.

2. The method of claim 1 wherein said accessing of said base language record and said preferred language record is a data retrieval operation.

3. The method of claim 1 wherein said accessing of said base language record and said preferred language record is an insert operation.

4. The method of claim 1 wherein said accessing of said base language record and said preferred language record is a delete operation.

5. The method of claim 1 wherein said accessing of said base language record and said preferred language record is an update operation.

6. A method of linking multilingual versions of data in a computerized database comprising the steps of:

defining a first table to contain base language records, said base language records storing base language versions of language-independent data items and language-dependent data items;

defining a second table to contain multilingual records, said multilingual records storing multilingual versions of language-dependent data items;

defining a linkage between said second table and said first table, said linkage identifies said second table to contain multilingual versions of said base language records.

7. The method of claim 6 wherein said first table comprises a relational database.

8. The method of claim 6 wherein said second table comprises a relational database.

9. The method of claim 6 further comprising access means to said first and second tables.

10. The method of claim 9 wherein said access means providing a data retrieval operation.

11. The method of claim 9 wherein said access means providing an insert operation.

12. The method of claim 9 wherein said access means providing a delete operation.

13. The method of claim 9 wherein said access means providing an update operation.

* * * * *